United States Patent [19]

Kisielewski

[11] 4,156,508
[45] May 29, 1979

[54] MOBILE MATERIAL SHEARING APPARATUS

[75] Inventor: Robert V. Kisielewski, Onalaska, Wis.

[73] Assignee: Cryogenic Recycling International Inc., LaCrosse, Wis.

[21] Appl. No.: 846,898

[22] Filed: Oct. 31, 1977

Related U.S. Application Data

[63] Continuation of Ser. No. 725,408, Sep. 22, 1976, abandoned.

[51] Int. Cl.² .................. B02C 18/22; B02C 23/12
[52] U.S. Cl. .................................. 241/80; 209/284; 241/236; 241/DIG. 31
[58] Field of Search ............... 241/79.3, 80, 97, 101.7, 241/167, 236, DIG. 31; 209/257, 284, 294, 297, 298

[56] References Cited

U.S. PATENT DOCUMENTS

| 270,217 | 1/1883 | Gates | 241/80 |
|---|---|---|---|
| 1,467,348 | 9/1923 | Young | 209/257 X |
| 3,841,570 | 10/1974 | Quinn | 241/101.7 X |
| 3,931,935 | 1/1976 | Holman | 241/80 X |
| 3,958,767 | 5/1976 | Stiles | 241/101.7 |

FOREIGN PATENT DOCUMENTS 2605013  8/1977  Fed. Rep. of Germany ........... 209/297

Primary Examiner—Howard N. Goldberg
Attorney, Agent, or Firm—Gerald S. Geren

[57] ABSTRACT

There is disclosed herein a mobile material shearing apparatus for receiving solid waste material and reducing said material to a comparatively small size. The apparatus includes an elongated movable truck bed on which is mounted a rotary shear into which the solid waste material is fed for size reduction. The smaller solid waste material exits the rotary shear and is received on a conveyor which delivers the material either to a predetermined location for disposal without further processing or to a rotary classificaton mechanism for further processing. The classifier receives the sheared solid waste material and separates particles which are above and below a predetermined size. A discharge is provided for receiving the smaller particles (fines) and means are provided for returning the larger particles (overs) to the shear for further size reduction.

1 Claim, 2 Drawing Figures

MOBILE MATERIAL SHEARING APPARATUS

This is a continuation of application Ser. No. 725,408, filed Sept. 22, 1976, now abandoned.

BACKGROUND OF THE INVENTION

This invention relates to a mobile apparatus for mechanically shearing solid waste materials, such as rubber tires, so as to reduce the material to a smaller and more readily handled size.

Disposal of solid waste materials represents a substantial ecological and economic problem. More particularly, scrap automobile tires are a problem in that until recently there has been no economical or ecologically satisfactory method for disposing of the tire or for recovery or reclaiming the rubber therein.

U.S. Pat. No. 3,911,772 discloses a mobile chopping apparatus for substantially ring-shaped bodies, such as tires into large segments which can be cryogenically treated. However, it has been found to be desirable to process the tires, or other waste materials so as to reduce them to sizes smaller than the chopped segments thereby permitting selective disposal, use or other further treatment.

It is therefore an object of this invention to provide an apparatus for reducing the size of solid waste material to a comparatively small size for disposal, use or other further treatment.

Rubber tires and other such solid wastes are usually dumped at local landfills and for that reason it is desirable to have such an apparatus located at the landfill site. However, many landfills may have need for such an apparatus only on a periodic basis, and thus a permanently installed plant or apparatus might not be economically feasible.

It is therefore another object of this invention to provide an apparatus for processing solid waste materials which apparatus can be moved from place-to-place depending upon demand.

In these and other objects of this invention will become apparent from the following description and appended claims.

SUMMARY OF THIS INVENTION

It has been found that rubber tires and other solid waste materials such as electrical conductors, sheet materials, beverage cans, etc., can be processed in a mobile shearing apparatus so as to reduce the size thereof to particles which can either be disposed of at the landfill site or shipped for further treatment or usage.

There is provided by virtue of this invention a mobile material shearing apparatus for receiving solid waste material and reducing said material to a comparatively small size. The apparatus includes an elongated movable truck bed on which is mounted a rotary shear into which the solid waste material is fed for size reduction. The smaller solid waste material exits the rotary shear and is received by a conveyor which delivers the material either to a predetermined location for disposal without further processing or to a rotary classification mechanism for further processing. The classifier receives the sheared solid waste material and separates particles which are above and below a predetermined size. A discharge is provided for receiving the smaller particles (fines) and means are provided for returning the larger particles (overs) to the shear for further size reduction.

The rotary shear mechanism includes a pair of shear rotor assemblies each of which includes a plurality of shear disc blades which are mounted in spaced relation on a pair of spaced rotatable shafts. The shear disc blades are arranged so that the blades on one rotor fit between the shear disc blades on the other rotor. Drive means are provided for rotating the shear rotors so as to draw the solid waste material therethrough. Rotatable stripper means are provided for cooperation with the rotors for preventing debris build-up between the shear blades.

DESCRIPTION OF THE PREFERRED EMBODIMENTS

General

Figure 1:
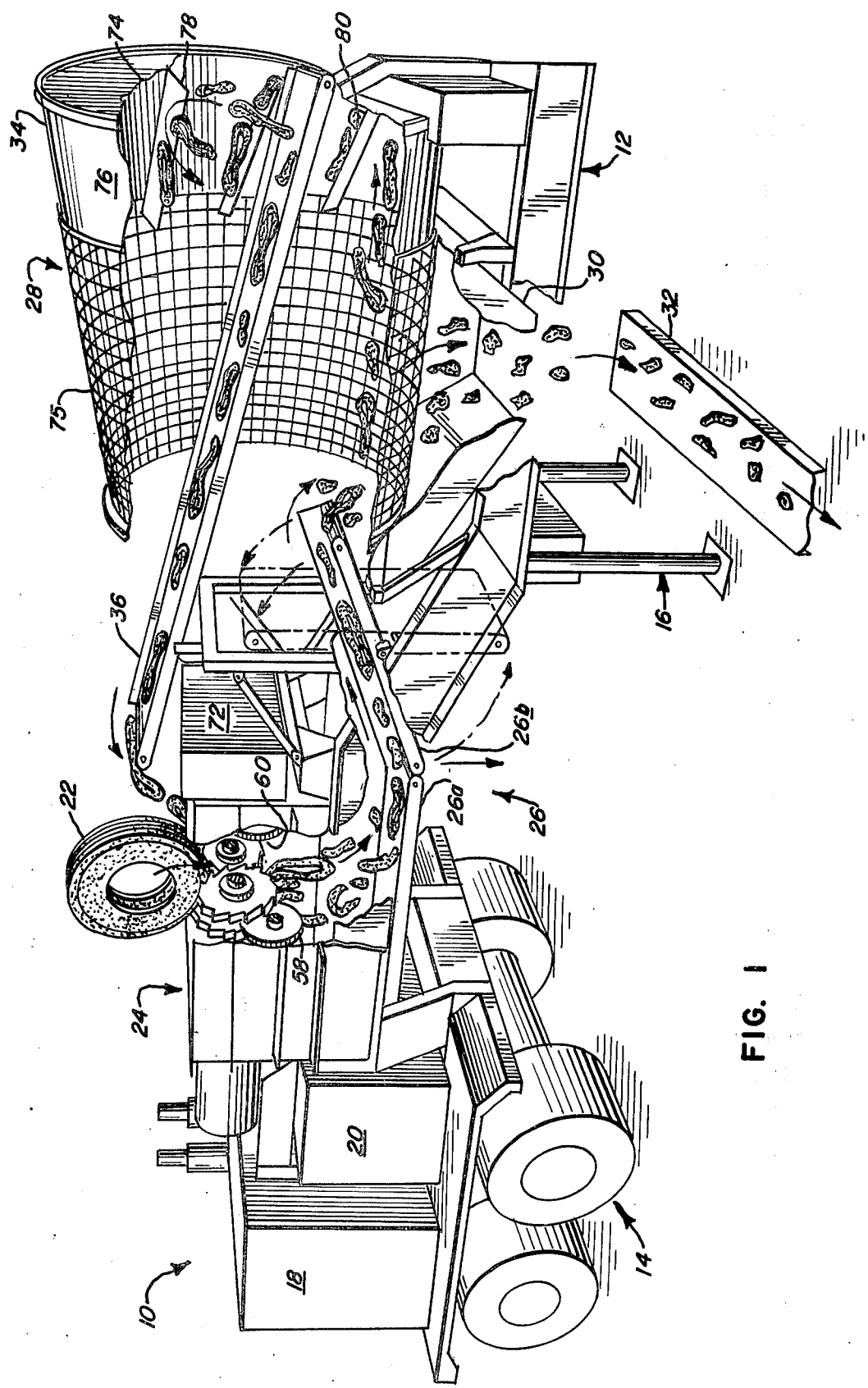
FIG. 1 is a perspective view of the mobile material shearing apparatus with portions thereof broken away so as to show details of the apparatus.

Referring now to FIG. 1, there is shown a mobile material shearing apparatus 10 which can be coupled to a truck tractor for movement from place-to-place. The apparatus includes an elongated bed or frame 12 which is supported at one end by rear wheels 14 and at an intermediate position by extensible legs or jacks 16. A diesel engine 18 is mounted on the bed over the wheels and drives a hydraulic motor system 20, generally, which in turn provides the power for operating the apparatus.

In general, solid waste such as a tire 22 is fed into a shear 24 which acts on the tire so as to reduce it to small sized particles, usually on the order of 2"×2". The particles exiting the shear, fall on a lower conveyor system 26 which can be arranged so as to discharge the solid waste particles without further treatment or which can direct the particles to a rotatable classifier 28. The classifier permits particles of less than a predetermined size (fines) to drop through a discharge chute 30 and onto a conveyor 32 for disposal. The larger unsorted particles (overs) move under the influence of gravity and the rotary forces to an elevating wheel section 34 which raises the overs and deposits them on an upper belt conveyor 36 which returns the overs to the shear 24 for subsequent reshearing.

The Shear Assembly

Figure 2:
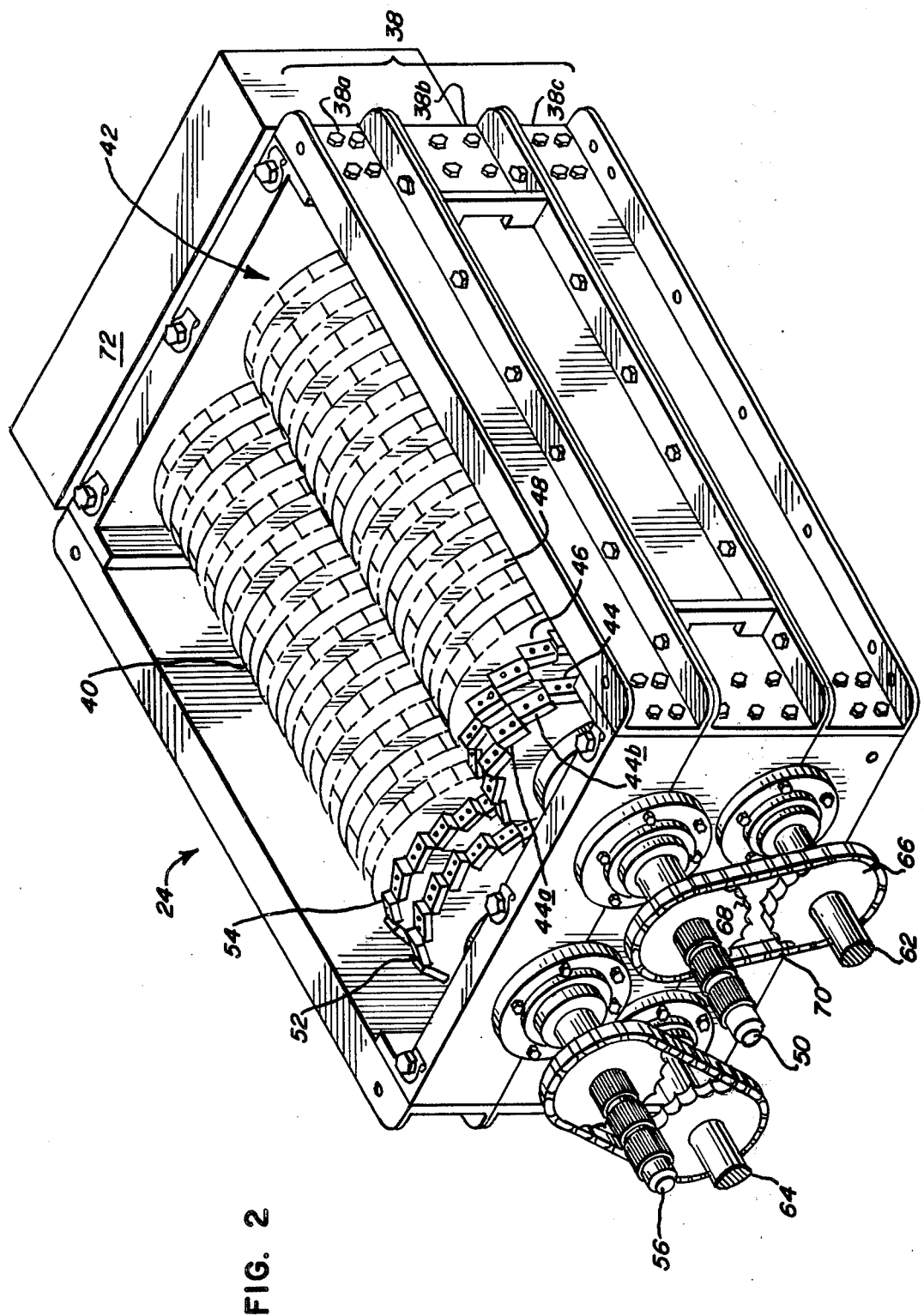
FIG. 2 is a perspective view showing the shear assembly and details of the drive connections thereto.

Referring now to FIG. 2, the shear assembly 24 includes a box-like frame 38 which defines an open-top or inlet and open-bottom or discharge. The frame includes a plurality of sections which are bolted together in a manner so as to provide access to the interior of the shear assembly for servicing and cleaning as necessary.

The shear assembly includes two parallel shear rotor assemblies 40 and 42 each of which includes a plurality of shear blade discs such as 44, 46 and 48 which are mounted on a shaft 50 and blades 52 and 54 which are mounted on a shaft 56.

Each of the shear blade discs 44, 46 and 48 are spaced axially along the shaft 50 by a distance slightly greater than the width of a shear blade disc. This permits the blade discs on one shaft to fit between the blade discs on the other shaft. Each of the shear blade discs such as 44 includes 15 replaceable shear blade elements such as 44a, 44b which are removably secured to the periphery of the disc. Thus, as the shear blades wear, they can be replaced as necessary.

Furthermore, it will be noted that the shear blade discs are mounted to the shaft in an angularly displaced relationship to one another. For example, if the position of the center-most shear blade disc is considered to be zero, the shear blades on the adjacent discs are displaced angularly 2° therefrom and moving outwardly therefrom the blades are positioned angularly in additional 2° increments. This provides a herringbone or generally V-shaped appearance to each of the rotors.

Rotary stripper gears such as 58 and 60, as shown in FIG. 1 are mounted on shafts 62 and 64 and are positioned generally beneath the rotors so that the stripper gears also fit between the shear blade discs mounted on the shafts 50 and 56 but do not interfere with the shearing action. The strippers operate to prevent debris build-up between the blade discs by removing particles that become lodged between the discs. As can be seen in FIG. 2, a gear and belt arrangement is provided for drivingly interconnecting a stripper rotor and a shear rotor. For example, the sprocket gears 66 and 68 and belt 70 interconnect the stripper gears on shaft 62 with the rotor 42 for synchronized drive. The stripper sprocket has 17 teeth while the rotor sprocket has 24 teeth. Thus, the stripper rotor disc rotates at a speed greater than the speed of the shearing rotors. A gear and belt arrangement is provided for each pair of stripper and shear blade discs.

The shear rotor assemblies are driven by a two counter-rotating Vickers hydraulic vane motors mounted directly to the shear rotor shafts. The motors can be driven at three fixed forward speeds and one reverse speed with the maximum speed of 30 rpm. If necessary, infinitely variable speed motors can be employed.

A timing gear system (not shown) is provided within a housing 72 for interconnecting the rotor drive shafts 50 and 56. With the timing gears connected, the rotors always turn in registry with each other. If the timing gear system is disconnected, then both rotors can be operated independently at the same speed or both rotors can be operated at different speeds.

It will be appreciated that due to the sectionalized construction of the support frame 38, the upper section 38a can be removed so as to permit servicing of the rotors alone. If necessary, the center section 38b can be removed which permits servicing of the stripper rotors which are mounted on the shafts 62 and 64. This leaves the stripper rotor supported by the bottom section 38c.

The Lower Conveyor

The lower conveyor system 26 includes a lower fixed conveyor 26a which is mounted in a fixed position below the shear assembly 24 for receiving the sheared particles for discharge. A movable lower conveyor 26b is also provided and is positioned at the discharge end of the fixed conveyor 26a. This conveyor is pivotable from a first position where it conveys the discharged particles to the classifier 28 to a vertical position as shown by the broken line. With the movable conveyor in the vertical position, no sizing or sorting takes place and the particles are merely discharged from the shear mechanism when classification is not necessary. In such a situation, the classifier 28 and upper conveyor 36 are not operated. The fixed conveyor 26a is driven by a variable speed hydraulic orbital motor and the movable conveyor 26b is driven by a chain drive from the conveyor 26a.

The Classifier

The classifier 28 is a hollow, frusto-conically shaped drum having an axis of rotation substantially parallel and aligned with the length of the bed 12. The small end of the drum is open and faces toward the shear mechanism and the large end of the drum is partially closed and includes an inwardly extending flange or end wall 74. The major portion of the drum includes a sizing screen 75 for sorting and classifying particles from the shear into fines which pass through the screen 75 and overs which are too large to pass through the screen. The screen 75 is removable and interchangable with other screens so as to permit a variety of classifications depending upon the size of particle desired.

The end of the drum includes the lifting section or elevating wheel 34. The elevating wheel includes a solid sleeve-like section 76 which is joined to the end wall 74. A plurality of lifting paddles or flights such as 78 and 80 are mounted to the inner side of the sleeve section 76 and extend radially inwardly. It will be noted that they are mounted on a slight angle to the axis of rotation. The larger particles or overs which do not fall through the screen move downwardly toward the elevating wheel 34. Gravity and the rotary action of the drum cause the overs to move into the elevating wheel at which point they are picked up by a paddle or flight and raised to another point at which they drop off of the paddles. The elevating wheel is operated at a speed of approximately 10 rpm and is driven by a variable speed hydraulic orbital motor.

The Upper Conveyor

The upper or return conveyor 36 is positioned so as to receive overs which fall from the paddle and transport those overs back to the shear for reshearing and subsequent resorting.

Operation

In operation, any type of solid waste material may be fed into the shear 24 and by the action of the shear, the solid waste is reduced to a smaller size. The smaller sized particles are discharged from the shear and received by a pair of lower conveyors for conveying the particles to a classification or sorting drum at which particles of a small size or fines may drop through the screen for subsequent disposal. Overs or particles which cannot fall through the screen move to the end of the drum which includes an elevating wheel section 34. The overs are raised by the elevating wheel and deposited on a return or upper conveyor which returns them to the shear for reshearing.

It will be appreciated that numerous changes and modifications can be made to the embodiments herein without departing from the spirit and scope of this invention.

What is claimed and desired to be secured by Letters Patent of the United States is:

1. A mobile material comminuting and classifying apparatus comprising:
   an elongated movable bed;
   comminuting means for receiving materials and for comminuting said materials;
   conveyor means for receiving comminuted material and for conveying said comminuted material to a predetermined location;

classifying means for receiving said comminuted material and classifying said comminuted material according to the size thereof;

discharge means for discharging particles from said apparatus;

wherein the improvement comprises, in combination:

said comminuting means being a rotary shear means adapted to receive automotive-type tires and other material for shearing into small particles, said comminuting means mounted on said movable bed;

said conveyor means including a fixed section and a selectively movable section, said movable section being pivotable about a substantially horizontal axis which is transverse to the elongated bed, said movable section pivoting between a first position in which it extends from the fixed section to the classifying means for delivery of particles to the classifying means, and a second, generally upright position for auxiliary particle discharge without classification;

said classifying means including a classifying section and an elevator section, said classifying means being a drum-like member having a frustoconical shaped wall and being mounted on said bed for rotation about the longitudinal axis thereof, said axis being substantially parallel to the length of the movable bed;

said classifying means having a large diameter end with a closed end wall means and an open, smaller diameter end positioned adjacent said rotary shear means, the end wall means at the large diameter end of said classifying means extending inwardly from the drum wall for preventing particles from exiting the classifying means through the large diameter end;

said classifying section including a sizing screen defined by a substantial portion of the drum wall between the large and small diameter ends, for classifying said comminuted material above and below a predetermined size, whereby the smaller sized particles drop through said screen and the large particles move toward the large diameter end under the influence of gravity;

said elevator section of said classifying section including elevator wheel means forming at least a portion of the drum wall between the classifying section and the large diameter end of the classifying means, the elevator wheel means receive the larger particles remaining within the drum after the larger particles have passed through the classifying section and have gravitated to the large diameter end of the classifying means, said elevator section also including a plurality of inwardly extending flights mounted to the interior of the drum wall, the flights being angularly positioned with respect to the axis of the classifying means, each flight adapted to receive the larger particles when in a lower position and discharge said particles when in an upper position;

discharge chute means underlying said classifying section from which waste material having a size less than a predetermined size exits from the classification means onto said discharge means; and recycling conveyor means partially positioned within said classifying means and extending from a position within said drum for receiving large particles discharged from said angular flights in the elevator section, through the small diameter open end of said drum and to a position for returning said larger particles to said rotary shear means for reshearing.

* * * * *